United States Patent
Tamura et al.

(10) Patent No.: US 8,357,750 B2
(45) Date of Patent: Jan. 22, 2013

(54) ADHESIVE COMPOSITION AND FILM ADHESIVE

(75) Inventors: Koki Tamura, Kawasaki (JP); Takahiro Asai, Kawasaki (JP); Hirofumi Imai, Kawasaki (JP); Takahiro Yoshioka, Kawasaki (JP); Atsushi Miyanari, Kawasaki (JP)

(73) Assignee: Tokyo Ohka Kogyo Co., Ltd., Kanagawa (JP)

( * ) Notice: Subject to any disclaimer, the term of this patent is extended or adjusted under 35 U.S.C. 154(b) by 326 days.

(21) Appl. No.: 12/824,548

(22) Filed: Jun. 28, 2010

(65) Prior Publication Data

US 2010/0331477 A1 Dec. 30, 2010

(30) Foreign Application Priority Data

Jun. 30, 2009 (JP) ................................ 2009-155072
May 19, 2010 (JP) ................................ 2010-115287

(51) Int. Cl.
*C08F 222/40* (2006.01)
(52) U.S. Cl. ........ 524/543; 524/548; 524/555; 524/556; 524/560; 526/262

(58) Field of Classification Search .................. 524/543, 524/548, 555, 556, 560; 526/262
See application file for complete search history.

(56) References Cited

U.S. PATENT DOCUMENTS

| | | | | |
|---|---|---|---|---|
| 5,369,200 A | * | 11/1994 | Schadeli et al. | 526/262 |
| 6,465,150 B1 | * | 10/2002 | Numata et al. | 430/270.1 |
| 2002/0156148 A1 | * | 10/2002 | Arase et al. | 523/1 |
| 2005/0170612 A1 | | 8/2005 | Miyanari et al. | |

FOREIGN PATENT DOCUMENTS

JP 2004-43732 2/2004

OTHER PUBLICATIONS

English translation of JP 2004-43732 published Feb. 12, 2004.

* cited by examiner

*Primary Examiner* — Ling Choi
*Assistant Examiner* — Wenwen Cai
(74) *Attorney, Agent, or Firm* — Wenderoth, Lind & Ponack, L.L.P.

(57) ABSTRACT

The adhesive composition according to the present invention includes a resin containing a polymer having an alkoxystyrene structure as a repeating unit, and an acid generator. In accordance with the present invention, it is possible to provide a novel adhesive composition which is excellent in heat resistance and which is easily stripped.

4 Claims, No Drawings

ADHESIVE COMPOSITION AND FILM ADHESIVE

This Nonprovisional application claims priority under 35 U.S.C. §119(a) on Patent Applications No. 2009-155072 filed in Japan on Jun. 30, 2009 and No. 2010-115287 filed in Japan on May 19, 2010, the entire contents of which are hereby incorporated by reference.

TECHNICAL FIELD

The present invention relates to an adhesive composition and a film adhesive. More specifically, the present invention relates to an adhesive composition and a film adhesive, each for temporarily fixing a sheet or a protection board to a product being processed, in a step of carrying out processing such as grinding of semiconductor products (e.g., semiconductor wafer), optical products, or the like.

BACKGROUND ART

In recent years, due to multiple functioning of mobile phones, digital AV devices, IC cards, and the like, demands have been increasing for downsizing, reduction in thickness, and high integration of semiconductor silicon chips (hereinafter referred to as "chips"). Further, the reduction of thickness is demanded for integrated circuits in which a plurality of chips are integrated, as typified by CSP (chip size package) and MCP (multi-chip package). In order to respond to the needs for a thin product, it is required to reduce the thickness of a chip to not more than 150 µm. Further, it is required to process the chip so that its thickness is reduced to not more than 100 µm for the CSP and the MCP, and not more than 50 µm for the IC card. A system-in-package (SiP) in which a plurality of semiconductor chips are mounted in a single semiconductor package has become an extremely important technique in order to accomplish downsizing, reduction in thickness, and high integration of chips that are installed in the semiconductor package. The downsizing, reduction in thickness, and high integration enables realization of multiple functioning, downsizing, and reduction of weight of electronic devices.

Conventionally, SiP products are manufactured by use of a method in which individual bumps (electrodes) provided on each of stacked chips are wired to a circuit board by a wire bonding technique. In order to respond to the demand for reduction in thickness and for high integration, a through-hole electrode technique is required, not the wire bonding technique. The through-hole electrode technique is a technique in which (i) chips each having a through-hole electrode are stacked and (ii) a bump is formed on a backside of the chips thus stacked.

A thin chip is manufactured by, for example, a method as follows: (i) a high-purity single crystal silicon or the like is sliced to a wafer form, (ii) a predetermined circuit pattern of an IC or the like is formed on a surface of the wafer by etching the surface of the wafer so that an integrated circuit is built, (iii) a back surface of the semiconductor wafer thus obtained is grinded by use of a grinder, and (iv) after the semiconductor wafer is grinded to a predetermined thickness, the semiconductor wafer is diced so as to form a chip shape. At this time, the predetermined thickness is around a range of 100 µm to 600 µm. Further, in a case of a chip in which a through-hole electrode is to be formed, the wafer is grinded to a thickness of around a range of 50 µm to 100 µm.

In the manufacture of the semiconductor chip, the semiconductor wafer readily breaks in a case where external force is given to the wafer in the grinding step or at the time when the wafer is carried to the dicing step. This is because the semiconductor wafer is thin and fragile, and because circuit patterns are unlevel. Moreover, the grinding step is carried out with purified water being poured over the back surface of the semiconductor wafer for the purpose of removing grinding dust or heat generated at the time of grinding. At this time, there is the need to prevent contamination of a circuit pattern surface due to the purified water used in cleaning or the like. Accordingly, in order to protect the circuit pattern surface of the semiconductor wafer and prevent breakage of the semiconductor wafer, a film adhesive for processing is attached on the circuit pattern surface while the grinding process is carried out.

In addition to the above examples, a step that requires high temperature processing in a course of forming a back-side wiring, such as a step of forming a through-hole electrode, is also carried out in such a manner that the semiconductor wafer is fixed by adhesive. There have been suggested several adhesive compositions that can be preferably used in such a step involving the high temperature processing (for example, Patent Literature 1).

Citation List

Patent Literature 1

Japanese Patent Application Publication, Tokukai, No. 2004-43732 A (Publication Date: Feb. 12, 2004)

SUMMARY OF INVENTION

Technical Problem

However, in consideration of various processing steps in the semiconductor process and, in addition, of easiness in stripping of an adhesive composition without causing damage (crack or the like) to a semiconductor wafer, further resistance to high temperatures and further easiness in stripping are demanded for the adhesive composition disclosed in Patent Literature 1.

The present invention is accomplished in view of the above problem. An object of the present invention is to provide a novel adhesive composition which is excellent in heat resistance and which can be easily stripped.

Solution to Problem

An adhesive composition of the present invention includes a resin containing a polymer having an alkoxystyrene structure as a repeating unit, and an acid generator.

ADVANTAGEOUS EFFECTS OF INVENTION

As described above, the adhesive composition according to the present invention has an alkoxystyrene structure, and therefore has excellent resistance to high temperatures. Further, a protective group in the alkoxystyrene structure dissociates therefrom due to an action of acid generated from an acid generator. This decreases adhesiveness of the adhesive composition and improves solubility of the adhesive composition for solvent. As a result, it becomes easy to strip and remove the adhesive composition from an object to which the adhesive composition adheres.

DESCRIPTION OF EMBODIMENTS

[Adhesive Composition]

One embodiment of an adhesive composition according to the present invention is described below.

An adhesive composition according to the present invention includes a resin containing a polymer having an alkoxystyrene structure as a repeating unit, and an acid generator.

A purpose of usage of the adhesive composition of the present invention is not especially limited provided that the adhesive composition is used as an adhesive agent. The present embodiment describes the adhesive composition by taking as an exemplary purpose a wafer support system in which a semiconductor wafer is temporarily bonded to a support plate by use of the adhesive composition of the present invention.

<Resin Component>

A "resin" contains at least one type of polymer having an alkoxystyrene structure as a repeating unit. The "resin" may contain at least one type of polymer having no alkoxystyrene structure as a repeating unit, if necessary.

In the present invention, "a ratio of the alkoxystyrene structure (or a structure having a maleimide group) relative to a total number of repeating units constituting the resin", which will be described later, indicates a ratio of the alkoxystyrene structure (or the structure having a maleimide group) relative to a total number of repeating units contained in the whole polymer (or all the polymers in the case where at least two types of polymers are included) that constitutes the resin.

(Alkoxystyrene Structure)

In the present specification, the alkoxystyrene structure indicates a styrene in which a hydrogen atom in an aromatic ring of styrene is substituted with an alkoxy group. The alkoxy group is not especially limited provided that an alkyl group dissociates due to an action of acid while leaving a hydroxy group in the styrene structure.

The alkoxystyrene structure according to the present invention is represented by General Formula (1):

[Chem. 1]

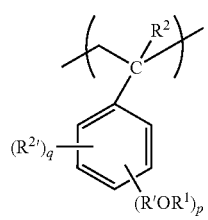

(1)

(wherein $R^1$ represents a C1 to C15 alkyl group; R' does not exist or is a C1 to C5 alkylene group; $R^2$ represents hydrogen or a C1 to C5 alkyl group; $R^{2'}$ represents a C1 to C5 alkyl group; p represents an integer of 1 to 3; and q represents 0 or an integer of 1 to 2).

Among the C1 to C15 alkyl group, $R^1$ that forms an alkoxy group with O (oxygen) is preferably a C4 to C15 alkyl group including a tertiary carbon atom.

Further, p is an integer of 1 to 3, and preferably 1. When p is 1, a linkage position of $R'OR^1$ including the alkoxy group may be any one of an o-position, an m-position, and a p-position. Further, when p is 1, the p-position is preferable as the linkage position of $R'OR^1$ in terms of easiness in contact with acid. When p is 2 or 3, any combinations of the linkage positions may be possible.

Moreover, q is 0 to 2, preferably 0 or 1, more preferably 0. When q is 1, a linkage position of $R^2$ may be any one of the o-position, the m-position, and the p-position. When q is 2, the linkage position of $R^2$ may be any combinations of the linkage positions may be possible.

The alkyl group for $R^2$ and the $R^{2'}$ may be, for example, a straight or branched alkyl group, such as a methyl group, an ethyl group, a propyl group, an isopropyl group, an n-butyl group, an isobutyl group, a tert-butyl group, a pentyl group, an isopentyl group, or a neopentyl group. Among them, the methyl group is preferable.

The adhesive composition according to the present invention has a styrene structure having a benzene ring in a component of the resin, as described above. This allows the adhesive composition to be excellent in resistance to high temperatures. For example, the adhesive composition has resistance to heat at not less than 250° C., as will be described in Examples. As a result, with the use of the adhesive composition according to the present invention, it is possible to form a stable adhesive layer in high-temperature processing in which the adhesive composition is exposed to a high-temperature environment that largely exceeds 200° C. (for example, not less than 250° C.).

Further, the alkoxystyrene structure has an alkoxy group that dissociates due to the action of acid while leaving a hydroxy group in the structure. When the adhesive composition that has been subjected to the high-temperature processing is subsequently subjected to light irradiation and additional heat processing, acid is generated from an acid generator (described later) and then diffused. Accordingly, this causes deprotection of the alkoxystyrene structure (that is, only an alkyl group in the alkoxy group dissociates). As the deprotection proceeds, the resin forms bubbles therein, thereby decreasing its adhesiveness. Further, the deprotection improves solubility of the resin for polar solvent. Consequently, the adhesive composition can be easily stripped, as appropriate, from a target object to which the adhesive composition adheres, and can be dissolved by the polar solvent. That is, the adhesive composition according to the present invention can be easily stripped from the target object to which the adhesive composition adheres, without causing damage to the target object that has low strength or remaining residue on the target object.

The alkyl group ($R^1$) that dissociates from styrene due to the action of acid is preferably an alkyl group having at least 4 carbon atoms including a tertiary carbon atom. Examples of the alkoxystyrene structure encompass tert-butoxy styrene and tert-amyloxy styrene. Among them, the tert-butoxy styrene is preferable in terms of low cost. The alkoxystyrene structure indicates one type selected from the aforementioned alkoxystyrene structures or a combination of at least two types selected from the aforementioned alkoxystyrene structures. In the case of the combination of at least two types of alkoxystyrene structures, the alkoxystyrene structures may be included in one type of polymer constituting the resin, or included, as various combinations, in at least two types of polymers constituting the resin.

In the adhesive composition according to the present invention, a ratio of the alkoxystyrene structure relative to a total mole number of repeating units constituting the resin is preferably not less than 10%, and more preferably not less than 10% but not more than 90%. When the ratio of the alkoxystyrene structure included in the resin is within the range, it is possible to more surely maintain excellent resistance to high temperatures and to select various components as repeating units constituting the resin.

(Structure Having Maleimide Group)

The adhesive composition according to the present invention may further include a structure having a maleimide group (a repeating structure having a maleimide). The adhesive composition including a resin having the structure having a maleimide group and the alkoxystyrene structure has an imide ring (a heterocycle having an imide group) in a main chain of a polymer. As a result, the adhesive composition can realize not only excellent heat resistance but also high adhesive strength in a high-temperature environment (especially, not less than 250° C.). The structure having a maleimide group may be included in a polymer having the alkoxystyrene structure as a repeating unit or in a polymer having no alkoxystyrene structure as a repeating unit.

A method for introducing the structure having a maleimide group may be, for example, a method in which a monomer having a maleimide group is solely polymerized, a method in which the monomer having a maleimide group is copolymerized with another monomer component(s), or the like method.

The monomer having a maleimide group is not especially limited provided that the monomer has a maleimide group, and can be copolymerized with other monomer components or be solely polymerized. However, the monomer having a maleimide group is preferably a compound represented by General Formula (2):

[Chem. 2]

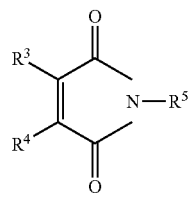

(2)

(where $R^3$ through $R^5$ each independently represent a hydrogen atom or a C1 through C20 organic group, and the organic group may contain an oxygen atom, a nitrogen atom, a sulfur atom, and a halogen atom).

The organic group represented by $R^3$ or $R^4$ in General Formula (2) is preferably a hydrogen atom, a methyl group, or an ethyl group. Especially, a hydrogen atom is more preferable among them.

The organic group represented by $R^5$ in General Formula (2) is preferably a straight or branched alkyl group, an alicyclic hydrocarbon group, an aryl group, an aralkyl group, or an organic group having a maleimide group. Especially, the alkyl group, the alicyclic hydrocarbon group, and the aryl group are more preferable among them.

In the specification, an "aliphatic series" is a relative concept with respect to an aromatic series and defined as a group, a compound, or the like having no aromatic property. For example, the "aliphatic, cyclic hydrocarbon group (alicyclic hydrocarbon group)" indicates a monocyclic hydrocarbon group or a polycyclic hydrocarbon group having no aromatic property.

Further, the alkyl group, the alicyclic hydrocarbon group, or the aryl group, represented by $R^5$, may have a substituent. The substituent is not especially limited, but may be, for example, a halogen atom, a straight or branched C1 to C6 alkyl group, a C3 to C6 alicyclic hydrocarbon group, or the like. In the specification, "having a substituent" means that part of or all hydrogen atoms in the alkyl group, the alicyclic hydrocarbon group, or the aryl group is/are substituted with a substituent. The halogen atom may be, for example, a fluorine atom, a chlorine atom, a bromine atom, an iodine atom, or the like. The fluorine atom is especially preferable as the halogen atom.

Examples of the alkyl group represented by $R^5$ encompass a methyl group, an ethyl group, a propyl group, a butyl group, a pentyl group, a hexyl group, a heptyl group, an octyl group, a lauryl group, and a stearyl group. Among them, the methyl group is especially preferable.

Examples of a monomer having a maleimide group in which the organic group represented by $R^5$ is the alkyl group encompass: N-methylmaleimide; N-ethylmaleimide; N-n-propylmaleimide; N-isopropylmaleimide; N-n-butylmaleimide; N-isobutylmaleimide; N-sec-butylmaleimide; N-tert-butylmaleimide; N-n-pentylmaleimide; N-n-hexylmaleimide; N-n-heptylmaleimide; N-n-octylmaleimide; N-laurylmaleimide; and N-stearylmaleimide. Among them, the N-methylmaleimide is especially preferable in terms of stability in industrial supply and excellent heat resistance.

The alicyclic hydrocarbon group represented by $R^5$ may be a cyclopropyl group, a cyclobutyl group, a cyclopentyl group, a cyclohexyl group, a cycloheptyl group, or a cyclooctyl group. Among them, the cyclohexyl group is especially preferable.

Examples of a monomer having a maleimide group in which the organic group represented by $R^5$ is the alicyclic hydrocarbon group encompass: N-cyclopropylmaleimide; N-cyclobutylmaleimide; N-cyclopentylmaleimide; N-cyclohexylmaleimide; N-cycloheptylmaleimide; and N-cyclooctylmaleimide. Among them, the N-cyclohexylmaleimide is especially preferable in terms of stability in industrial supply and excellent heat resistance.

The aryl group represented by $R^5$ may be a phenyl group, a methylphenyl group, or the like. Among them, the phenyl group is especially preferable.

Examples of a monomer having a maleimide group in which the organic group represented by $R^5$ is the aryl group encompass: N-phenylmaleimide; N-m-methylphenylmaleimide; N-o-methylphenylmaleimide; and N-p-methylphenylmaleimide. Among them, the N-phenylmaleimide is especially preferable in terms of stability in industrial supply and excellent heat resistance.

In addition to the above examples, there are further other examples of the monomer having a maleimide group, such as: N-benzylmaleimide; N-phenethylmaleimide; 1methyl-2,4-bismaleimidebenzene; N,N'-m-phenylene -bismaleimide; N,N'-p-phenylene bismaleimide; N,N'-m-toluoylene bismaleimide; N,N'-4,4-biphenylene bismaleimide; N,N'-4,4-(3,3'-dimethyl-biphenylene)bismaleimide; N,N'-4,4-(3,3'-dimethyl diphenyl methane)bismaleimide; N,N'-4,4-(3-3'-diethyl diphenyl methane)bismaleimide; N,N'-4,4-diphenylmethane bismaleimide; N,N'-4,4-diphenylpropane bismaleimide; N,N'-3-3'-diphenylsulfone bismaleimide; N,N'-4,4-diphenyl ether bismaleimide; and the like.

One type of these structures having a maleimide group, for constituting a resin contained in the adhesive composition, may be selected and used solely, or two or more types of the structures having a maleimide group may be selected and used in combination.

A content of the structure having a maleimide group, contained in the resin, is not especially limited, and may be selected as appropriate in accordance with aimed properties of the adhesive composition (aimed heat resistance and adhesive strength). When a total amount of the resin is 100 parts by mass, the structure having a maleimide group (i.e., a repeating structure having a maleimide group) is contained preferably by not less than 5 part by mass but not more than 50 parts by mass, more preferably by not less than 20 parts by mass but not more than 40 parts by mass. If the structure having a maleimide group is contained in the resin by not less than 5 parts by mass but not more than 50 parts by mass, it is possible to further improve a resultant adhesive layer in heat resistance and adhesive strength in a high temperature environment.

(Other Components Contained in Resin)

The resin may further include, to an extent in which essential properties (heat resistance, easiness in stripping, and the like) are not lost, various well-known compounds each as a repeating unit. The loss of essential properties means, for example, that the action of acid causes deprotection (polarity conversion) of a repeating unit and that an allowable temperature limit of the adhesive composition decreases to a temperature lower than a desired temperature. The resin may include any compounds each as the repeating unit, provided that the compounds are ones that are normally contained in a resin for an adhesive composition and do not cause such problems.

The resin may further include a (meth)acrylic acid or a (meth)acrylic acid ester, for example. Examples of the (meth)

acrylic acid ester encompass: an alkyl (meth)acrylate having a chain structure; a (meth)acrylic acid ester having an aliphatic ring; and a (meth)acrylic acid ester having an aromatic ring.

Examples of the alkyl (meth)acrylate having a chain structure encompass: acrylic long chain alkyl ester having a C15 to C20 alkyl group, and acrylic alkyl ester having a C1 to C14 alkyl group.

Examples of the acrylic long chain alkyl ester encompass: an alkyl ester of an acrylic or methacrylic acid, whose alkyl group is an n-pentadecyl group, an n-hexadecyl group, an n-heptadecyl group, an n-octadecyl group, an n-nonadecyl group, n-eicosyl group, or the like. Note that the alkyl group may be of a branched state.

The acrylic alkyl esters having a C1 to C14 alkyl group may be, for example, publicly known acrylic alkyl esters that are used in existing acrylic adhesives. Examples of these acrylic alkyl esters are alkyl esters of an acrylic or methacrylic acid whose alkyl group is a methyl group, an ethyl group, a propyl group, an n-butyl group, a tert-butyl group, a 2-ethylhexyl group, an isooctyl group, an isononyl group, an isodecyl group, a dodecyl group, a lauryl group, a tridecyl group, or the like.

Examples of the (meth)acrylic acid ester having an aliphatic ring encompass: cyclohexyl(meth)acrylate; cyclopentyl(meth)acrylate; 1-adamantyl(meth)acrylate; norbornyl (meth)acrylate; isobornyl(meth)acrylate; tricyclodecanyl (meth)acrylate; tetracyclododecanyl(meth)acrylate; and dimethylol-tricyclodecane diacrylate.

The (meth)acrylic acid ester having an aromatic ring is not particularly limited to a specific one. The aromatic ring may be, for example, a phenyl group, a benzyl group, a tolyl group, a xylyl group, a biphenyl group, a naphthyl group, an anthracenyl group, a phenoxymethyl group, or a phenoxyethyl group. The aromatic ring may have a chained or branched C1 to C5 alkyl group; specifically, it is preferably phenoxyethyl acrylate.

A content of the (meth)acrylic acid or (meth)acrylic acid ester contained in the resin is not particularly limited as long as copolymerization reaction proceeds. The content of the (meth)acrylic acid or (meth)acrylic acid ester may be appropriately selected according to aimed properties (aimed heat resistance, aimed adhesive strength, and the like) of the adhesive composition. For example, when a total amount of the resin is 100 parts by mass, the (meth)acrylic acid or (meth) acrylic acid ester may be contained in the resin preferably by not less than 5 parts by mass but not more than 50 parts by mass, more preferably by not less than 5 parts by mass but not more than 40 parts by mass. When the (meth)acrylic acid or (meth)acrylic acid ester is contained by not less than 5 parts by mass, flexibility of the adhesive composition increases, thereby improving crack resistance. As a result, it is possible to obtain a smooth surface when the adhesive composition is applied. When the (meth)acrylic acid or (meth)acrylic acid ester is contained by not more than 50 parts by mass, it is possible to improve heat resistance.

<Acid Generator>

The adhesive composition according to the present invention further contains an acid generator. The acid generator is not particularly limited, but is a compound which generates acid and which is publicly known to a person skilled in the related technical field. The acid generator is preferably a photo-acid generator that generates acid by being irradiated with light.

In the adhesive composition according to the present invention, a ratio of the acid generator, relative to 100 parts by weight of the resin, is preferably not less than 0.1 parts by weight but not more than 10 parts by weight, more preferably 0.1 parts by weight but not more than 5 parts by weight. When the acid generator is contained in the adhesive composition in such a range, it is possible to perform processing (for example, exposure) for generating acid at short times and to surely prevent the acid generator from decomposing due to high temperatures.

Examples of the acid generator encompass: onium salt acid generators such as iodonium salts and sulfonium salts; oxime sulfonate acid generators; diazomethane acid generators such as bisalkyl sulfonyl diazomethanes, bisaryl sulfonyl diazomethanes, and poly(bis-sulfonyl)diazomethanes; nitrobenzylsulfonate acid generators; iminosulfonate acid generators; and disulfone acid generators. Among these acid generators, the onium salt acid generators have a high decomposition temperature and therefore are suitable for high-temperature processing. The following described the onium salt acid generators as one example of the acid generator, more specifically.

The onium salt acid generator is a compound represented by, for example, General Formula (3) or (4):

[Chem. 3]

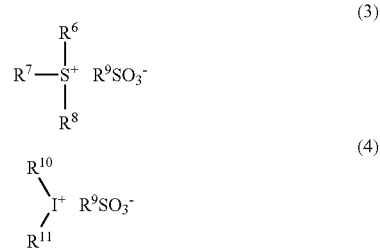

(wherein $R^6$ to $R^8$, $R^{10}$, and $R^{11}$ each independently represent an aryl group or an alkyl group; two of $R^6$ to $R^8$ may be bonded to each other to form a ring with a sulfur atom in the formula; $R^9$ represents a substituted or unsubstituted alkyl group, alkyl halide group, aryl group, or alkenyl group; and at least one of $R^6$ to $R^8$ represents an aryl group, and at least one of $R^{10}$ and $R^{11}$ represents an aryl group).

As described above, at least one of $R^6$ to $R^8$ represents an aryl group. It is preferable that two or more of $R^6$ to $R^8$ be aryl groups, and it is particularly preferable that all of $R^6$ to $R^8$ be aryl groups.

The aryl group for $R^6$ to $R^8$ is not particularly limited, but may be, for example, a C6 to C20 aryl group in which part or all of its hydrogen atoms is or is not substituted with alkyl groups, alkoxy groups, halogen atoms or hydroxy groups. The aryl group is preferably a C6 to C10 aryl group because it can be synthesized at a low cost. Specific examples of such an aryl group encompass a phenyl group and a naphthyl group.

The alkyl group, with which hydrogen atoms of the aryl group may be substituted, is preferably a C1 to C5 alkyl group, and more preferably a methyl group, an ethyl group, a propyl group, an n-butyl group, or a tert-butyl group. The alkoxy group, with which hydrogen atoms of the aryl group may be substituted, is preferably a C1 to C5 alkoxy group, more preferably a methoxy group, an ethoxy group, an n-propoxy group, an iso-propoxy group, an n-butoxy group or a tert-butoxy group, and most preferably a methoxy group or an ethoxy group. The halogen atom, with which hydrogen atoms of the aryl group may be substituted, is preferably a fluorine atom.

The alkyl group for $R^6$ to $R^8$ is not particularly limited but may be, for example, a straight, branched or cyclic C1 to C10 alkyl group. Examples of the alkyl group encompass a methyl group, an ethyl group, an n-propyl group, an isopropyl group, an n-butyl group, an isobutyl group, an n-pentyl group, a cyclopentyl group, a hexyl group, a cyclohexyl group, a nonyl group, and a decanyl group. Among them, a methyl group is most preferable because it can be synthesized at a low cost.

In a case where any two of $R^6$ to $R^8$ are bonded to each other to form a ring with a sulfur atom in the formula, it is preferable that the two of $R^6$ to $R^8$ form a 3 to 10-membered ring including the sulfur atom, and it is more preferable that the two of $R^6$ to $R^8$ form a 5 to 7-membered ring including the sulfur atom. The ring thus formed may be, for example, benzothiophene, dibenzothiophene, 9H-thioxanthen, thioxanthone, thianthrene, phenoxathiin, tetrahydrothiophenium, or tetrahydrothiopyranium. Further, in the case where any two of $R^6$ to $R^8$ are bonded to each other to form a ring with a sulfur atom in the formula, the remaining one of $R^6$ to $R^8$ is preferably an aryl group. As examples of the aryl group, the same as the above-mentioned aryl groups for $R^6$ to $R^8$ can be given.

$R^9$ represents a substituted or unsubstituted alkyl group, alkyl halide group, aryl group, or alkenyl group. The alkyl group for $R^9$ may be a straight, branched or cyclic alkyl group. The straight or branched alkyl group has preferably 1 to 10 carbon atoms, more preferably 1 to 8 carbon atoms, and most preferably 1 to 4 carbon atoms. The cyclic alkyl group has preferably 4 to 15 carbon atoms, more preferably 4 to 10 carbon atoms, and most preferably 6 to 10 carbon atoms.

The alkyl halide group for $R^9$ may be, for example, the straight, branched or cyclic alkyl group in which part or all of its hydrogen atoms are substituted with halogen atoms. Examples of the halogen atom encompass a fluorine atom, a chlorine atom, a bromine atom, and an iodine atom. Among them, the fluorine atom is preferable. In the alkyl halide group, a ratio of a total number of the halogen atoms (halogenation ratio (%)) relative to a total number of the halogen atoms and hydrogen atoms included in the alkyl halide group is preferably not less than 10% but not more than 100%, more preferably not less than 50% but not more than 100%, and most preferably 100%. Among these alkyl halide groups, one having a higher halogenation ratio is preferable because strength of acid becomes higher.

The aryl group for $R^9$ is preferably a C6 to C20 aryl group.
The alkenyl group for $R^9$ is preferably a C2 to C10 alkenyl group.

The "substituted or unsubstituted" in $R^9$ means that part of or all of hydrogen atoms in the straight, branched or cyclic alkyl group, the alkyl halide group, the aryl group, or the alkenyl group may be substituted with substituents (atoms or groups other than the hydrogen atom), or all of the hydrogen atoms may not be substituted with the substituents. The number of substituents in $R^9$ may be not less than 1. The substituents may be a halogen atom, a heteroatom, and an alkyl group. Examples of the halogen atom or the alkyl group are the same as those of the aforementioned halogen atoms or alkyl groups in the aforementioned alkyl halide group. Examples of the heteroatom encompass an oxygen atom, a nitride atom, and a sulfur atom.

Examples of the onium salt acid generator represented by General Formula (3) or (4) encompass: diphenyliodonium trifluoromethanesulfonate or nonafluorobutanesulfonate; bis (4-tert-butylphenyl)iodonium trifluoromethanesulfonate or nonafluorobutanesulfonate; triphenylsulfonium trifluoromethanesulfonate, heptafluoropropanesulfonate or nonafluorobutanesulfonate; tri(4-methylphenyl)sulfonium trifluoromethanesulfonate, heptafluoropropanesulfonate or nonafluorobutanesulfonate; dimethyl(4-hydroxynaphthyl)sulfonium trifluoromethanesulfonate, heptafluoropropanesulfonate or nonafluorobutanesulfonate; monophenyldimethylsulfonium trifluoromethanesulfonate, heptafluoropropanesulfonate or nonafluorobutanesulfonate; diphenylmonomethylsulfonium trifluoromethanesulfonate, heptafluoropropanesulfonate or nonafluorobutanesulfonate; (4-methylphenyl)diphenylsulfonium trifluoromethanesulfonate, heptafluoropropanesulfonate or nonafluorobutanesulfonate; (4-methoxyphenyl) diphenylsulfonium trifluoromethanesulfonate, heptafluoropropanesulfonate or nonafluorobutanesulfonate; tri(4-tert-butyl)phenylsulfonium trifluoromethanesulfonate, heptafluoropropanesulfonate or nonafluorobutanesulfonate; diphenyl(1-(4-methoxy)naphthyl)sulfonium trifluoromethanesulfonate, heptafluoropropanesulfonate or nonafluorobutanesulfonate; di(1-naphthyl) phenylsulfonium trifluoromethanesulfonate, heptafluoropropanesulfonate or nonafluorobutanesulfonate; 1-phenyltetrahydrothiophenium trifluoromethanesulfonate, heptafluoropropanesulfonate or nonafluorobutanesulfonate; 1-(4-methylphenyl)tetrahydrothiophenium trifluoromethanesulfonate, heptafluoropropanesulfonate or nonafluorobutanesulfonate; 1-(3,5-dimethyl-4-hydroxyphenyl) tetrahydrothiophenium trifluoromethanesulfonate, heptafluoropropanesulfonate or nonafluorobutanesulfonate; 1-(4-methoxynaphthalene-1-trifluoromethanesulfonate, heptafluoropropanesulfonate or nonafluorobutanesulfonate; 1-(4-ethoxynaphthalene-1-yl)tetrahydrothiophenium trifluoromethanesulfonate, heptafluoropropanesulfonate or nonafluorobutanesulfonate; 1-(4-n-butoxynaphthalene-1-yl)tetrahydrothiophenium trifluoromethanesulfonate, heptafluoropropanesulfonate or nonafluorobutanesulfonate; 1-phenyltetrahydrothiopyranium trifluoromethanesulfonate, heptafluoropropanesulfonate or nonafluorobutanesulfonate; 1-(4-hydroxyphenyl)tetrahydrothiopyranium trifluoromethanesulfonate, heptafluoropropanesulfonate or nonafluorobutanesulfonate; 1-(3,5-dimethyl-4-hydroxyphenyl) tetrahydrothiopyranium trifluoromethanesulfonate, heptafluoropropanesulfonate or nonafluorobutanesulfonate; and 1-(4-methylphenyl)tetrahydrothiopyranium trifluoromethanesulfonate, heptafluoropropanesulfonate or nonafluorobutanesulfonate.

Further, it is also possible to use, as the acid generator, onium salts in which an anion moiety of these onium salts is replaced by alkyl sulfonate, such as methanesulfonate, n-propanesulfonate, n-butanesulfonate, or n-octanesulfonate.

Further, the onium salt acid generator may be one in which the anion moiety in General Formula (3) or (4) is replaced by an anion moiety represented by General Formula (5a) or (5b):

[Chem. 4]

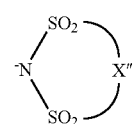

(5a)

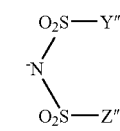

(5b)

(wherein X" represents a C2 to C6 alkylene group in which at least one hydrogen atom is substituted with a fluorine atom; and Y" and Z" each independently represent a C1 to C10 alkyl group in which at least one hydrogen atom is substituted with a fluorine atom). In this case, a cation moiety of the onium salt acid generator is the same as the cation moiety in General Formula (3) or (4).

X" is a straight or branched alkylene group in which at least one hydrogen atom is substituted with a fluorine atom. The alkylene group has 2 to 6 carbon atoms, preferably 3 to 5 carbon atoms, and most preferably 3 carbon atoms. Y" and Z" each independently represent a straight or branched alkyl group in which at least one hydrogen atom is substituted with a fluorine atom. The alkyl group has 1 to 10 carbon atoms, preferably 1 to 7 carbon atoms, and more preferably 1 to 3 carbon atoms.

It is preferable that the number of carbon atoms in the alkylene group for X" or that in the alkyl group for Y" and Z" be as small as possible within the aforementioned range in terms of high solubility for solvent, and the like. Further, in the alkylen group for X" or the alkyl group for Y" and Z", it is preferable that the number of hydrogen atoms that are substituted with fluorine atoms be as large as possible, because the strength of acid becomes higher, and the transparency to high energy light or electron beams of not more than 200 nm is improved. A ratio (fluorination ratio (%)) of the fluorine atoms in the alkylene group or the alkyl group is preferably not less than 70% but not more than 100%, more preferably not less than 90% but not more than 100%, and most preferably 100%. The alkylene group and the alkyl group in each of which all hydrogen atoms are substituted with the fluorine atoms (i.e., the fluorination ratio is 100%) are called a perfluoroalkylene group and a perfluoroalkyl group, respectively.

Furthermore, the onium salt acid generator may be a sulfonium salt having an anion moiety represented by General Formula (6a) or (6b):

[Chem. 5]

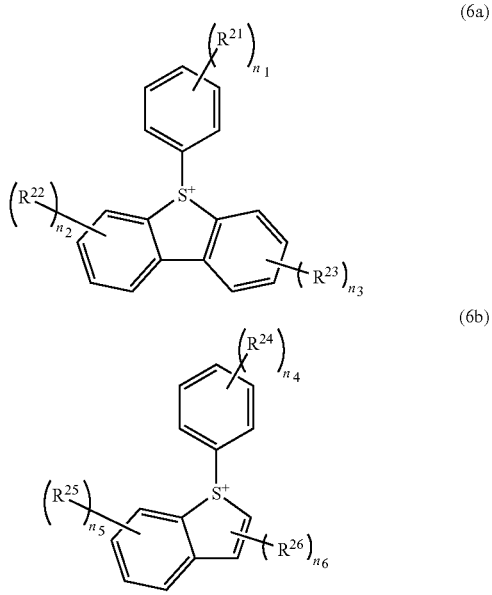

(wherein $R^{21}$ to $R^{26}$ each independently represent an alkyl group, an acetyl group, an alkoxy group, a carboxy group, a hydroxy group or a hydroxyalkyl group; $n_1$ to $n_5$ each independently represent an integer of 0 to 3; and $n_6$ represents an integer of 0 to 2).

The alkyl group for $R^{21}$ to $R^{26}$ is preferably a C1 to C5 alkyl group, more preferably a straight or branched alkyl group, and most preferably a methyl group, an ethyl group, a propyl group, an isopropyl group, an n-butyl group or a tert-butyl group. The alkoxy group is preferably a C1 to C5 alkoxy group, more preferably a straight or branched alkoxy group, and most preferably a methoxy group or an ethoxy group. The hydroxyalkyl group is preferably the alkyl group in which one or more hydrogen atoms are substituted with hydroxy groups. Examples of the hydroxyalkyl group encompass a hydroxymethyl group, a hydroxyethyl group and a hydroxypropyl group.

In a case where $n_1$ to $n_6$ each independently represent an integer of not less than 2, respective sets of a plurality of $R^{21}$ to a plurality of $R^{26}$ are the same or different from each other. $n_1$ is preferably 0, 1 or 2, more preferably 0 or 1, and most preferably 0. It is preferable that each of $n_2$ and $n_3$ be independently 0 or 1, more preferably 0. $n_4$ is preferably 0, 1 or 2, and more preferably 0 or 1. $n_5$ is preferably 0 or 1, and more preferably 0. $n_6$ is preferably 0 or 1, and more preferably 1.

The adhesive composition according to the present invention may include, as the acid generator according to the present invention, one type of the aforementioned onium salt acid generators and the publicly known acid generators, or at least two types of the aforementioned onium salt acid generators and the publicly known acid generators in combination.

<Other Components in Adhesive Composition>

The adhesive composition according to the present invention may further include, to an extent in which essential properties of the present invention is not lost, miscible additives, for example, an additional resin, a plasticizing agent, an adhesive auxiliary agent, a stabilization agent, a coloring agent, and a surface active agent, each of which is commonly used in the technical field that the present invention pertains to, for improving effectiveness of an adhesive agent.

For example, the adhesive composition according to the present invention may further include a nitrogen-containing organic compound as an optional component. The nitrogen-containing organic compound is not particularly limited provided that it functions as an acid diffusion control agent, i.e., a quencher which traps the acid generated from the acid generator upon exposure. A variety of nitrogen-containing organic compounds that function as the acid diffusion control agent have already been proposed, and any of these known compounds may be selected appropriately. Among these compounds, an aliphatic amine, particularly a secondary aliphatic amine or tertiary aliphatic amine is preferable. An aliphatic amine is an amine having at least one aliphatic group, and it is preferable that the aliphatic amine have 1 to 20 carbon atoms.

Examples of the aliphatic amines encompass amines in which at least one hydrogen atom of ammonia ($NH_3$) is substituted with an alkyl group or hydroxyalkyl group having not more than 12 carbon atoms (i.e., alkylamines or alkylalcoholamines), and cyclic amines.

Specific examples of the alkylamines and alkylalcoholamines encompass: monoalkylamines such as n-hexylamine, n-heptylamine, n-octylamine, n-nonylamine, and n-decylamine; dialkylamines such as diethylamine, di-n-propylamine, di-n-heptylamine, di-n-octylamine, and dicyclohexylamine; trialkylamines such as trimethylamine, triethylamine, tri-n-propylamine, tri-n-butylamine, tri-n-hexylamine, tri-n-pentylamine, tri-n-heptylamine, tri-n-octylamine, tri-n-nonylamine, tri-n-decanylamine, and tri-n-dodecylamine; and alkyl alcohol amines such as diethanolamine, triethanolamine, diisopropanolamine, triisopropanolamine, di-n-octanolamine, tri-n-octanolamine, stearyldiethanolamine, and lauryldiethanolamine. Among these, trialkylamines and/or alkyl alcohol amines are preferable.

Examples of the cyclic amines encompass heterocyclic compounds containing a nitrogen atom as a heteroatom. The heterocyclic compound may be a monocyclic compound (aliphatic monocyclic amine), or a polycyclic compound (aliphatic polycyclic amine).

Specific examples of the aliphatic monocyclic amine encompass piperidine and piperazine.

The aliphatic polycyclic amine preferably has 6 to 10 carbon atoms, and specific examples thereof encompass 1,5- diazabicyclo [4.3.0]-5-nonene, 1,8-diazabicyclo[5.4.0]-7-undecene, hexamethylenetetramine, and 1,4-diazabicyclo [2.2.2]octane.

Examples of an aromatic amine encompass: aniline, pyridine, 4-dimethylaminopyridine, pyrrole, indole, pyrazole, imidazole and derivatives thereof; and diphenylamine, triphenylamine, and tribenzylamine.

Further other examples of the aliphatic amines encompass: tris(2-methoxymethoxyethyl)amine, tris{2-(2-methoxyethoxy)ethyl}amine, tris{2-(2-methoxyethoxymethoxy) ethyl}amine, tris{2-(1-methoxyethoxy)ethyl}amine, tris{2-(1-ethoxyethoxy)ethyl}amine, tris{2-(1-ethoxypropoxy) ethyl}amine, and tris [2-{2-(2-hydroxyethoxy)ethoxy}ethyl] amine.

One type of these compounds may be used solely, or two or more types of these compounds may be used in combination.

The nitrogen-containing organic compound is contained normally by a ratio of 0.01 parts by weight to 5.0 parts by weight relative to 100 parts by weight of the resin. When the ratio of the nitrogen-containing organic compound is in the above range, it is advantageously possible to reduce an exposure amount necessary for generating acid.

Further, the adhesive composition may be diluted by use of an organic solvent, to an extent in which the essential properties of the present invention are not lost, so that viscosity of the adhesive composition may be adjusted. The organic solvent may be an organic solvent that can dissolve other components included in the adhesive composition and uniformly bring them into solution. In view of this, as an organic solvent that can be employed in the present invention, one type or at least two types of conventionally known organic solvents may be selected as appropriate.

Examples of the organic solvent encompass lactones such as γ-butyrolactone; ketones such as acetone, methyl ethyl ketone, cycloheptanone, cyclohexanone, methyl-n-pentyl ketone, methyl isopentyl ketone, and 2-heptanone; polyhydric alcohols, such as ethylene glycol, diethylene glycol, propylene glycol, and dipropylene glycol; compounds having an ester bond, such as ethylene glycol monoacetate, diethylene glycol monoacetate, propylene glycol monoacetate, and dipropylene glycol monoacetate; polyhydric alcohol derivatives including compounds having an ether bond, such as monoalkylether (e.g., monomethylether, monoethylether, monopropylether or monobutylether) or monophenylether of any of the above polyhydric alcohols or compounds having an ester bond (among these, propylene glycol monomethyl ether acetate (PGMEA) and propylene glycol monomethyl ether (PGME) are preferable); cyclic ethers such as dioxane; esters such as methyl lactate, ethyl lactate (EL), methyl acetate, ethyl acetate, butyl acetate, methyl pyruvate, ethyl pyruvate, methyl methoxypropionate, and ethyl ethoxypropionate; and aromatic organic solvents such as anisole, ethylbenzylether, cresylmethylether, diphenylether, dibenzylether, phenetole, butylphenylether, ethylbenzene, diethylbenzene, pentylbenzene, isopropylbenzene, toluene, xylene, cymene and mesitylene.

These organic solvents can be used solely, or at least two types of these organic solvents can be used in combination.

In a case where one of the organic solvents is used solely, it is preferable that PGMEA, PGME, or EL be used.

A usage amount of the organic solvent is not especially limited provided that the adhesive composition has concentration sufficient for the adhesive composition to be applied on a support substrate, such as a semiconductor wafer. On this account, the usage amount of the organic solvent is selected appropriately according to an intended thickness of an adhesive layer obtained by applying the adhesive composition. Generally, the usage amount of the organic solvent is adjusted so that a solid content of the adhesive composition is not less than 10 mass % but not more than 60 mass %, and preferably not less than 20 mass % but not more than 45%.

[Polymerization (Copolymerization) Reaction]

In a case where the resin is prepared by (co)polymerization reaction, the (co)polymerization reaction may be carried out by a publicly known method, and is not especially limited in any particular manner. For example, the adhesive composition according to the present invention can be obtained by stirring a monomer composition by use of an existing stirring device.

A temperature condition in the (co)polymerization reaction may be set as appropriate and is not limited. However, the temperature condition is preferably in a range of 60 to 150° C., further preferably in a range of 70 to 120° C.

In the (co)polymerization reaction, a solvent may be used as appropriate. The aforementioned organic solvents can be used as the solvent. Among the aforementioned organic solvents, PGMEA is especially preferable.

In the copolymerization reaction to obtain the adhesive composition according to the present invention, a polymerization initiator may be used as necessary. Examples of the polymerization initiator encompass: azo compounds such as 2,2'-azobisisobutylonitrile, 2,2'-azobis(2-methylbutylonitrile), dimethyl 2,2'-azobis isobutyrate, 1,1'-azobis(cyclohexane-1-carbonitrile), and 4,4'-azobis(4-cyanovaleric acid); and organic peroxides such as decanoyl peroxide, lauroyl peroxide, benzoyl peroxide, bis(3,5,5-trimethyl hexanoyl)peroxide, succinic acid peroxide, tert-butyl peroxy-2-ethylhexanoate, tert-butyl peroxypivalate, and 1,1,3,3-tetramethylbutylperoxy-2-ethylhexanoate. One type of these polymerization initiators may be used solely, or alternatively two or more types of the polymerization initiators may be used in combination as necessary. An amount of the polymerization initiator to be used may be set as appropriate in accordance with a combination of the monomer composition, reaction conditions, and the like, and is not particularly limited.

[Film Adhesive]

A film adhesive according to the present invention includes a film, and an adhesive layer provided on the film, containing any one of the aforementioned adhesive compositions. The film adhesive can be obtained in the process of a film adhesive method. The film adhesive method is such that (i) a film adhesive is formed in advance in such a manner that an adhesive layer containing any of the aforementioned adhesive compositions is formed, in advance, on a film that is a temporal base material, such as a flexible film, and then the adhesive layer is dried so as to form a film adhesive, and (ii) the film adhesive thus formed is used by being attaching to a material to be processed.

As described in the section [Adhesive Composition], since the adhesive composition contains a resin having an alkoxystyrene structure as a repeating unit, the adhesive layer constituted by the adhesive composition is excellent in heat resistance. Moreover, since the adhesive composition further contains an acid generator, adhesive strength of the adhesive composition decreases after the adhesive composition is subjected to light exposure and subsequently to high-temperature processing. That is, the film adhesive according to the present invention is excellent in heat resistance and can be excellently stripped at intended timing.

The film adhesive may be arranged such that a protection film is further provided on an adhesive surface of the adhesive layer. In this case, the adhesive layer is easily provided on a material to be processed in such a manner that (i) the protection film which covers the adhesive layer is peeled off, (ii) the adhesive layer thus exposed is placed on the material to be processed, and (iii) the film (flexible film or the like) is peeled off from the adhesive layer.

The adhesive composition according to the present invention as described above may be used in various ways depending on its purpose. For example, the adhesive composition in a liquid form may be applied on a material to be processed, such as a semiconductor wafer, so as to form an adhesive layer. However, the use of the film adhesive according to the present invention allows formation of an adhesive layer having an even thickness and a good surface smoothness as compared to a case where the adhesive composition is directly applied on a material to be processed so as to form an adhesive layer.

The film to be used in manufacture of the film adhesive of the present invention is not limited, as long as an adhesive layer formed on the film is strippable from the film and the film is a release film which can transfer the adhesive layer to a surface to be processed of a protection board, a wafer, or the like. An example of the film for forming the adhesive layer is a flexible film made of a synthetic resin film, such as polyethylene terephthalate, polyethylene, polypropylene, polycarbonate or polyvinyl chloride, and having a thickness of 15 µm to 125 µm. It is preferable for the film to be releasing-processed if necessary so that transfer can be readily carried out.

A publicly known method may be appropriately used as a method for forming the adhesive layer on the film in accordance with a desired thickness or a desired evenness of the adhesive layer, and is not particularly limited. The publicly known method may be, for example, a method in which the adhesive composition according to the present invention is applied on a film by use of an applicator, a bar coater, a wire bar coater, a roll coater, or a curtain flow coater so that a dried adhesive layer to be formed on the film has a film thickness of 10 to 1000 µm. The roll coater is especially preferable among them because the roll coater is suitable to form an adhesive layer excellent in uniform thickness and the use of the roll coater allows efficiently forming a film having a large thickness.

In a case where the protection film is used, the protection film to be used is not limited as long as the film is strippable from the adhesive layer. However, it is preferable for the protection film to be, for example, a polyethylene terephthalate film, a polypropylene film, or a polyethylene film. Moreover, the protection film is preferably a film on which silicon is applied by coating or baking. This allows the protection film to be easily stripped off from the adhesive layer. A thickness of the protection film is not particularly limited, but is preferably in a range of 15 µm to 125 µm. This is because the film adhesive attached to the protection film can secure flexibility of the film adhesive.

A method of using the film adhesive is not particularly limited. For example, the following method may be taken in a case where the protection film is used: (i) the protection film is stripped off from the film adhesive, (ii) the adhesive layer thus exposed is placed on a surface of a material to be processed, and (iii) a heating roller is rolled on the film (a surface opposite to the surface on which the adhesive layer is formed), so that the adhesive layer is thermally compressed onto the surface of the material to be processed. At this time, by sequentially rolling up the protection film on a roller such as a reel roller, the protection film thus stripped off from the film adhesive may be stored and reused.

The purpose of usage of the adhesive composition of the present invention is not particularly limited. However, the adhesive composition is suitably used as an adhesive composition for adhering, to a substrate such as a semiconductor wafer, a protection board for use in high-precision processing of a semiconductor wafer. The adhesive composition of the present invention is particularly suitably used as an adhesive composition (or an adhesive layer containing the adhesive composition) for attaching a substrate to a support plate, when the substrate such as the semiconductor wafer is grinded so that a thickness of the substrate is reduced (e.g., Japanese Patent Application Publication, Tokukai, No. 2005-191550 A).

[Stripping Solution]

A commonly used stripping solution in the technical field may be used as a stripping solution for removing the adhesive composition according to the present invention. However, from the viewpoint of environmental burden and strippability, a stripping solution whose main component is PGMEA, ethyl acetate, or methyl ethyl ketone is preferably used.

EXAMPLES

The following deals with examples of the adhesive composition of the present invention. However, the following examples are just exemplified to facilitate understanding of the present invention and do not limit the present invention.

<Composition of Adhesive Composition>

As compositions of Examples and Comparative Examples in the present invention, a plurality of adhesive compositions having different compositions were prepared. Respective compositions of the prepared adhesive compositions are shown in Table 1 as below.

TABLE 1

|  | Example 1 | Example 2 | Example 3 | Example 4 | Example 5 | Example 6 | Example 7 |
|---|---|---|---|---|---|---|---|
| Resin 1 | 100 | — | — | — | — | 50 | 25 |
| Resin 2 | — | 100 | — | — | — | — | — |
| Resin 3 | — | — | 100 | — | — | — | — |
| Resin 4 | — | — | — | 100 | 100 | — | — |
| Resin 5 | — | — | — | — | — | 50 | 75 |
| Acid Generator 1 | 1 | 1 | 1 | 1 | — | 1 | 1 |
| Acid Generator 2 | — | — | — | — | 1 | — | — |
| Organic Solvent | 150 | 150 | 150 | 180 | 180 | 150 | 150 |

|  | Example 8 | Example 9 | Example 10 | Example 11 | Example 12 | Example 13 | Example 14 |
|---|---|---|---|---|---|---|---|
| Resin 6 | 100 | — | — | — | — | — | — |
| Resin 7 | — | 100 | — | — | — | — | — |
| Resin 8 | — | — | 100 | 100 | 100 | 100 | 100 |
| Acid Generator 1 | 1 | 1 | 1 | 5 | 0.3 | 1 | 1 |
| Acid Diffusion Control Agent 1 | — | — | — | — | — | 0.1 | — |
| Acid Diffusion Control Agent 2 | — | — | — | — | — | — | 0.1 |
| Organic Solvent | 180 | 180 | 180 | 180 | 180 | 180 | 180 |

TABLE 1-continued

|  | Comparative Example 1 | Comparative Example 2 | Comparative Example 3 |
|---|---|---|---|
| Resin 9 | 100 | — | — |
| Resin 10 | — | 100 | — |
| Resin 11 | — | — | 100 |
| Acid Generator 1 | 1 | 1 | 1 |
| Organic Solvent | 150 | 150 | 180 |

(Measure: Part by Mass)

(Details of Components in Each Adhesive Composition)

Resin 1 is a resin containing p-hydroxystyrene and p-tert-butoxystyrene by a mole ratio of 12:88.

Resin 2 is the same type of resin as Resin 1 and contains p-hydroxystyrene and p-tert-butoxystyrene by a mole ratio of 54:46.

Resin 3 is the same type of resin as Resin 1 and contains p-hydroxystyrene and p-tert-butoxystyrene by a mole ratio of 80:20.

Resin 4 is a resin of a random copolymer containing p-tert-butoxystyrene, methyl methacrylate, isobornyl methacrylate, n-butyl acrylate, and dimethylol-tricyclodecane diacrylate by a mole ratio of 52:15:10:13:10.

Resin 5 is a resin of a random copolymer containing cyclohexylmaleimide, N-phenyl-maleimide, styrene, and methyl methacrylate by a mole ratio of 20:20:10:50.

Resin 6 is a resin of a random copolymer containing p-tert-butoxystyrene, methyl methacrylate, and cyclohexylmaleimide by a mole ratio of 40:30:30.

Resin 7 is the same type of resin as Resin 6 and contains p-tert-butoxystyrene, methyl methacrylate, and cyclohexylmaleimide by a mole ratio of 30:30:40.

Resin 8 is a resin of a random copolymer containing p-tert-butoxystyrene, methyl methacrylate, cyclohexylmaleimide, and acrylic acid by a mole ratio of 40:30:25:5.

Resins of Examples 6 and 7 are mixtures of Resin 1 and Resin 5 that are dissolved in an organic solvent so as to be mixed, and are not copolymers of respective compositions.

Resin 9 is a resin of a random copolymer containing tert-butyl methacrylate and acrylic acid by a mole ratio of 95:5.

Resin 10 is a resin containing, by a mole ratio of 65:35, p-hydroxystyrene and a structure in which a hydrogen atom of a hydroxy group in p-hydroxystyrene is substituted with a 1-ethoxyethyl group as a protective group.

Resin 11 is a resin of a random copolymer containing cyclohexylmaleimide, N-phenyl-maleimide, styrene, and methyl methacrylate by a mole ratio of 20:20:10:50.

An acid generator 1 is dinaphthylphenylsulfonium nonafluoro-n-butanesulfonate.

An acid generator 2 is triphenylsulfonium nonafluoro-n-butanesulfonate.

An acid diffusion control agent 1 is triethanolamine.

An acid diffusion control agent 2 is tri-n-octylamine.

An organic solvent is propylene glycol monomethyl ether acetate (PGMEA).

<Evaluation of Adhesive Composition>

The adhesive compositions of Examples and Comparative Examples were evaluated for their heat resistance (degassing temperature) and easiness in stripping.

(Evaluation of Heat Resistance)

The adhesive compositions of Examples and Comparative Examples were spin-coated on respective semiconductor wafers so as to form respective layers each having a thickness of 15 µm. The layers were then baked at 110° C. or 150° C. Then, bare glasses were placed on the respective layers of the adhesive compositions and baked at 150° C. so that the bare glasses were attached to the respective semiconductor wafers. The respective semiconductor wafers onto which the bare glasses were attached by use of the respective adhesive compositions were evaluated for their heat resistance based on degassing temperatures measured by conducting heat resistance tests. A degassing temperature is a temperature at which strength exceeds 200,000 in TDS measurement. The degassing temperatures of the adhesive compositions of Examples and Comparative Examples are shown in Table 2.

(Evaluation of Easiness in Stripping)

The respective semiconductor wafers onto which the bare glasses were attached by use of the respective adhesive compositions were irradiated for 1 minute with scattering light (including g, h, and i beams) of 10 mW/cm². The scattering light was applied to bare-glass sides of the respective semiconductor wafers. After that, the semiconductor wafers were further baked at 110° C. or 140° C. Under each of the baking temperature conditions, the adhesive compositions were evaluated as follows: an adhesive composition that was easily stripped without damaging the semiconductor wafer was evaluated as "G (Good)"; an adhesive composition that was not easily striped was evaluated as "P (Poor)". Results of the evaluations are shown in Table 2.

TABLE 2

|  | Example 1 | Example 2 | Example 3 | Example 4 | Example 5 | Example 6 | Example 7 | Example 8 | Example 9 |
|---|---|---|---|---|---|---|---|---|---|
| Degassing Temperature (° C.) | 260 | 260 | 260 | 290 | 290 | 250 | 250 | 290 | 295 |
| UV | P | P | P | P | P | P | P | P | P |
| UV + Baking (110° C.) | G | G | P | G | P | G | G | P | P |
| UV + Baking (140° C.) | G | G | G | G | G | G | G | G | G |

|  | Example 10 | Example 11 | Example 12 | Example 13 | Example 14 | Comparative Example 1 | Comparative Example 2 | Comparative Example 3 |
|---|---|---|---|---|---|---|---|---|
| Degassing Temperature (° C.) | 290 | 285 | 295 | 295 | 295 | 220 | 260 | 250 |
| UV | P | P | P | P | P | P | P | P |
| UV + Baking (110° C.) | G | G | P | G | G | G | P | P |
| UV + Baking (140° C.) | G | G | G | G | G | G | P | P |

As shown in Table 2, the adhesive compositions of Examples 1 through 14 of the present invention each exhibited a degassing temperature of not less than 250° C. From the results, it is demonstrated that the adhesive compositions of Examples 1 through 14 have very excellent resistance to high temperatures. Especially, the adhesive compositions of Examples 4 and 5, and Examples 8 through 14 each contain, as a resin, a structure having a maleimide group, a (meth) acrylic acid and a (meth)acrylic acid ester, or contain any combination of these compounds, so that they exhibited degassing temperatures of not less than 285° C. Accordingly, it is demonstrated that the adhesive compositions of Examples 4 and 5, and Examples 8 through 14 have resistance to very high temperatures. Further, when baked at 140° C. after UV exposure, the adhesive compositions of Examples 1 through 14 were largely decreased in adhesive strength, so that they could be easily striped without damaging the semiconductor wafers. Especially, it is demonstrated that the adhesive compositions of Examples 1, 2, 4, 6, 7, 10, 11, 13 and 14 can be easily stripped when baked at 110° C. after UV exposure.

On the other hand, the adhesive compositions of Comparative Examples 1 through 3, which do not contain an alkoxystyrene structure (p-butoxystyrene, in this case), resulted in that the heat resistance was poor with a low degassing temperature (Comparative Example 1) or that the heat resistance was good but the strippability was so poor that the bare glass could not be stripped from the semiconductor wafer without any problems (Comparative Examples 2 and 3).

As has been apparent from the above results, an adhesive composition containing a resin having an alkoxystyrene structure as a repeating unit, and an acid generator has excellent heat resistance and achieves easiness in stripping. Consequently, the adhesive composition can be used even in high-temperature (for example, not less than 250° C.) processing and does not cause any damage to a semiconductor wafer when the adhesive composition is stripped. This results in that production yield of semiconductor products, optical products or the like products can be improved.

Industrial Applicability

According to the present invention, it is possible to provide an adhesive composition and a film adhesive, each of which can be preferably used in high-temperature processing that is applied to production of various products. Especially, it is possible to provide an adhesive composition and a film adhesive, each of which is suitable for a step of processing a semiconductor wafer or a chip by exposing it to a high temperature environment at not less than 250° C.

The invention claimed is:

1. An adhesive composition comprising:
    a resin containing a polymer having, as a repeating unit, (A) an alkoxystyrene structure, (B) at least one selected from the group consisting of a (meth)acrylic acid structure and a (meth)acrylic acid ester structure, and (C) a repeating structure having a maleimide group; and
    an acid generator,
    wherein a ratio of (A) the alkoxystyrene structure : (C) the repeating structure having the maleimide group : (B) the at least one selected from the group consisting of the (meth)acrylic acid structure and the (meth)acrylic acid ester structure is 30-40 mol % : 25-40 mol % : 5-35 mol % in molar ratio.

2. The adhesive composition according to claim 1, wherein:
    the alkoxystyrene structure is a tert-butoxystyrene structure or a tert-amyloxystyrene structure.

3. The adhesive composition according to claim 1, wherein:
    a ratio of the acid generator relative to 100 parts by mass of the resin is not less than 0.1 parts by mass but not more than 10 parts by mass.

4. A film adhesive comprising:
    a film; and
    an adhesive layer provided on the film, containing an adhesive composition according to claim 1.

* * * * *